March 23, 1926.
O. H. HESSE
1,577,463
TRACTOR TRAILER
Filed June 12, 1923     2 Sheets-Sheet 1
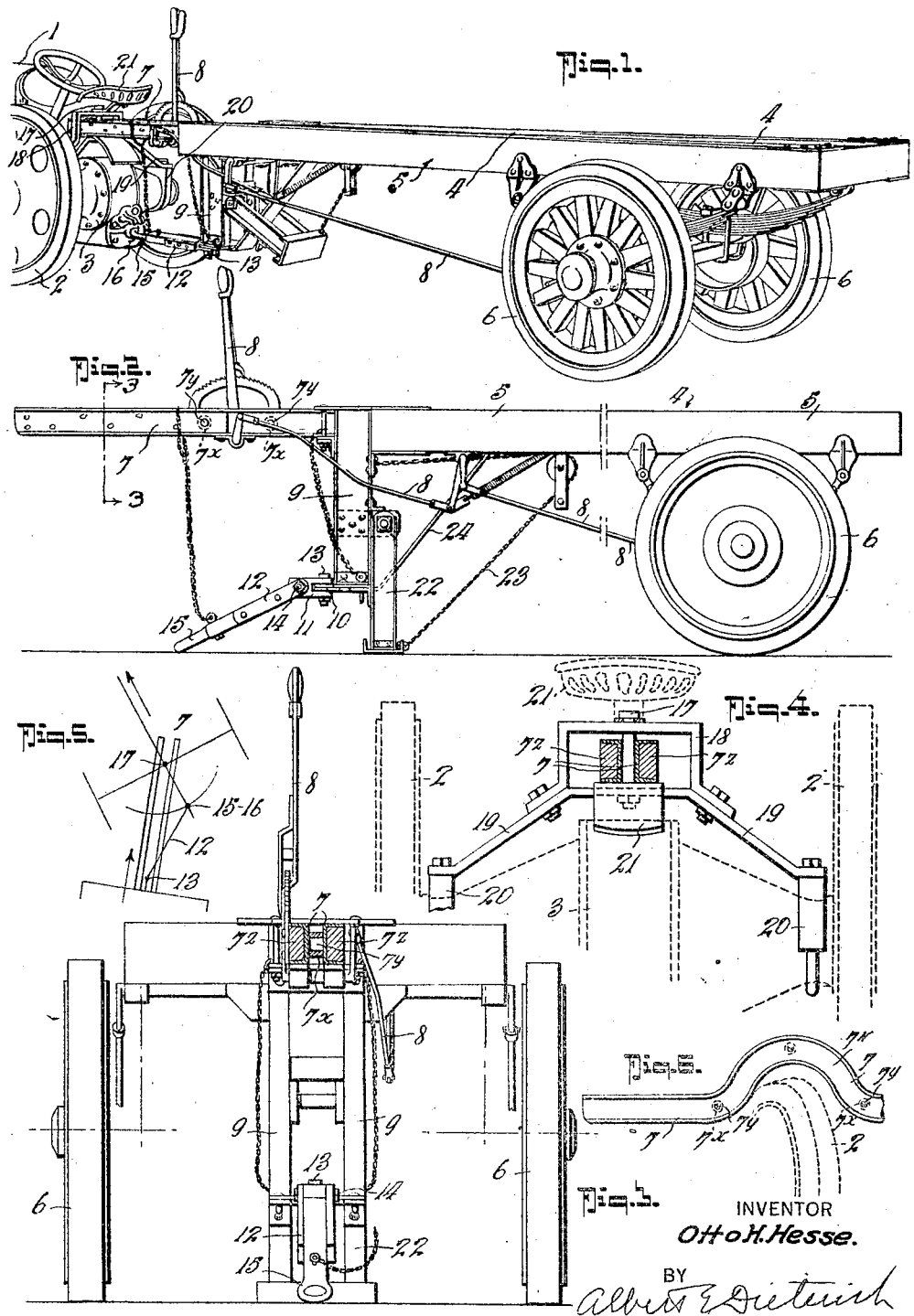
INVENTOR
Otto H. Hesse.
BY
Albert E Dieterich
ATTORNEY

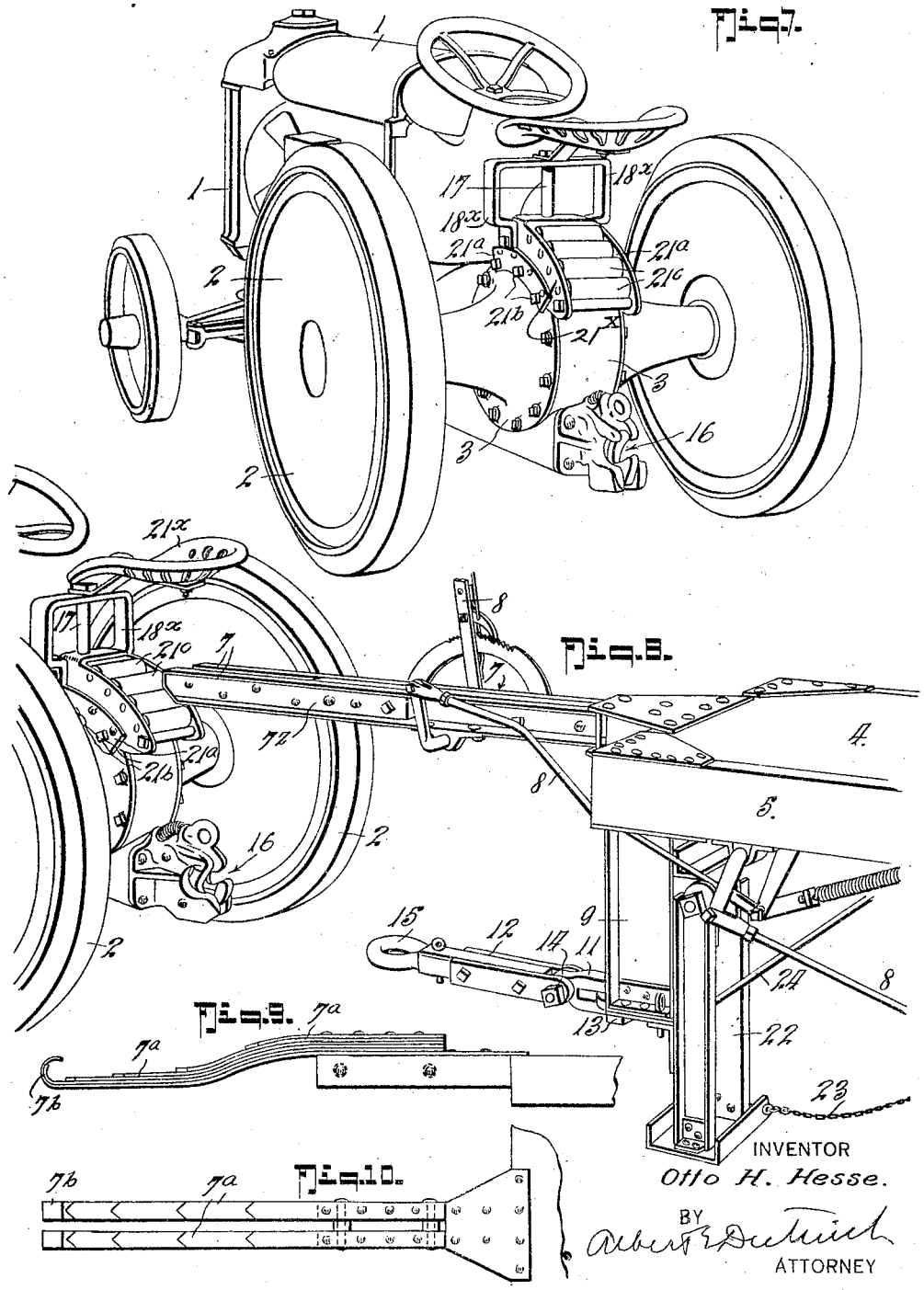

Patented Mar. 23, 1926.

1,577,463

UNITED STATES PATENT OFFICE.

OTTO H. HESSE, OF LEAVENWORTH, KANSAS.

TRACTOR TRAILER.

Application filed June 12, 1923. Serial No. 644,947.

*To all whom it may concern:*

Be it known that I, OTTO H. HESSE, a citizen of the United States, residing at Leavenworth, in the county of Leavenworth and State of Kansas, have invented a new and Improved Tractor Trailer, of which the following is a specification.

My invention relates to certain new and useful improvements in that type of land vehicle known as tractor trailers and the invention especially has for its object to provide a trailer and its connections with a tractor of such design and construction as to enable an ordinary tractor, such as the well-known Fordson, for example, to be used for towing heavy loads in an efficient and practical way.

An object of the invention is so to connect the trailer to the tractor that the draft or pulling force will be applied in such a way as not to cause the forward guide wheels to lift off of the ground or to cause the rear driving wheels to lose their traction. In other words, it is an object of the invention so to arrange the trailer with respect to the tractor that a portion of the trailer's load will be applied vertically downward over the drive wheel axis thereby to impose sufficient weight on the drive wheels to increase their traction in spite of the decreasing of the traction due to an uplifting turning leverage about the front axle by the pull on a lower draw bar (to be later described) below the rear axle and prevent any tendency to raise the rear wheels from the ground when an excessive load is being applied, the application of the pull or draft force being made below the drive wheel axis and in the rear thereof and the axle of the trailer being higher than the lower draft coupling on the tractor.

A further object of the invention is to provide a flexible means of connection between the trailer and the tractor which is located below the tractor drive wheel axis, and further to provide means for guiding the trailer to cause it to follow the tractor properly, by the use of a tongue projecting over the rear axle housing of the tractor and suitably guided thereover in such manner as to apply the weight of the front end of the trailer directly over and to the rear axle housing without the necessity of connecting the tongue to the tractor and without the application of any draft or pulling strain through the tongue.

A still further object of the invention is to connect the trailer and tractor by a universal draw-bar connection, i. e.: one which will permit movement in all up and down and sidewise directions.

In another embodiment of the invention it is an object to provide a saddle which is attached to the housing of the tractor by the use of the same cap screws that hold the right and left housings to the main center housing of the differential thus avoiding the use of arms extending out to the collars of the housing near the wheels; and the incorporation into the saddle construction of a series of rollers on that portion extending in a curve backward and downward to facilitate backing the tractor under the tongue of the trailer when bringing the trailer and tractor together for coupling.

In still another embodiment the invention has for an object to provide a spring suspension on the end of the tongue which rests on the saddle, to relieve both the tractor and trailer of excessive and sudden jars and shocks when travelling over rough roads.

More specifically, the invention includes those novel details of construction, combination and arrangement of parts, all of which will be first fully described, then specifically pointed out in the appended claims and illustrated in the accompanying drawings, in which:

Figure 1 is a perspective view of one embodiment of my invention.

Figure 2 is a side elevation of the trailer, per se.

Figure 3 is a cross section of the same taken approximately on the line 3—3 of Figure 2.

Figure 4 is a detail cross section through the tongue adjacent to the saddle.

Figure 5 is a diagrammatic view showing the position of the parts in turning.

Figure 6 is a detail elevation of the modified form of tongue coupling or goose neck to clear the tractor driving wheels in short turning.

Figure 7 is a perspective view of a tractor with another form of saddle.

Figure 8 is a perspective view of the same (together with a portion of the trailer) showing the same in position to be backed under the tongue.

Figure 9 is a detail elevation of a modification of the invention.

Figure 10 is a plan view of the structure shown in Figure 9.

In the drawings, which illustrate preferred embodiments of my invention and in which like numerals and letters of reference indicate like parts in all of the figures, 1 is the tractor, which is of the usual construction (a Fordson type tractor being illustrated) and which includes the driving wheels 2 and rear axle housing 3.

4 is the trailer whose frame 5 is suitably mounted on a pair of wheels 6 and from the front of which a forked tongue 7 projects.

The trailer may also have a suitable brake mechanism 8 for the usual purposes.

Projected down from the front end of the frame 5 and adjacent the tongue 7 is a standard 9 which is rigidly secured to the frame and the tongue and carries at its lower end a shackle plate 10 to which the member 11 of the draft appliance 12 is pivoted on a vertical axis 13, the members 11 and 12 being pivoted together at 14 on a horizontal axis. Thus, the bar 12 is connected to the standard 9 by a universal joint. The draft bar 12 has an eye or loop 15 at its front end by which it may be coupled to the tractor pintle hook so as to have a flexible (preferably laterally and vertically movable) connection with the tractor.

The tongue 7 is bifurcated or forked (see Figures 3 and 4) to straddle a guiding bolt 17 located in a loop 18 of a saddle frame 19, suitably secured at 20 to the axle housing and is positioned directly over the same. An arc plate or saddle proper 21 is carried by the frame 19 and it is on this saddle that the tongue 7 rests, thereby applying, a portion of the weight of the load to the tractor drive wheels.

The saddle 21 may be secured to the frame 19 as shown in Figures 1 and 4 or the saddle $21^x$ and the loop $18^x$ may be directly mounted on the centre portion of the axle housing by flanges $21^a$ and the cap screws $21^b$ which unite the right and left axle housings to the central section as indicated in Figures 7 and 8. Also in the latter form the saddle $21^x$ has antifriction rollers $21^c$ in its rear curved portion on which the tongue rides and which facilitate coupling in easing the tongue into place as the tractor is backed under the same.

The tongue 7 is preferably made of two channel irons spaced apart by spacer collars $7^x$ and riveted or bolted together at $7^y$, filler blocks $7^z$ being provided in the channels, if desired.

Instead of a straight tongue, the tongue may be provided with a loop or goose neck $7^n$ (Figure 6) for short turning purposes so as to clear the traction wheels 12 in making sharp turns.

If desired the tongue may have its bifurcated part built up of leaf springs $7^a$, $7^a$, as shown in Figures 9 and 10, so as to relieve both the trailer and tractor of excessive and sudden jars and shocks when negotiating rough roads. The ends of the springs $7^a$ are preferably rounded, as at $7^b$ to facilitate the operation of backing the tractor under the tongue so that the springs of the tongue will easily slide up on to the saddle of the tractor.

By making the bifurcated ends of the tongue of leaf springs, each spring section will move an independent bearing on the saddle so that when going over uneven roads should the axis of the tractor rear wheels incline laterally which would tend to impart a thrust to the tongue, both edges of the spring will remain in contact with the saddle and will prevent all of the downward load or thrust from occurring at one side or edge of the tongue.

It should be clearly understood that the tongue 7 is not connected to the tractor in any way but merely rests on the saddle 21 and is guided against lateral movement by the bolt 17. In other words, the bolt 17 keeps the axis of the tongue always substantially passing through the axis of the bolt 17, the loop 18 being wide enough to allow the turning radius desired (see Figure 5).

22 is a hinged foot which supports the front end of the trailer when the trailer is disconnected from the tractor. It may be raised and held up by a suitable chain device 23.

The standard 9 is braced rearwardly by a suitable brace 24.

In action the traction pull is transmitted entirely through the draw bar 12 and its connections with the tractor and trailer, the bolt 17 riding freely back and forth in the fork of the tongue during turning to compensate for the shortening of the distance between the point of connection 13 and the axis of the bolt 17 when the draw bar 12 makes an angle, other than a straight angle, to the longitudinal axis of the tractor passing through the point of connection 15—16. The curvature of the saddle allows for the movement of the tongue when the tractor and trailer are riding over elevations and depressions in the road way, and affords a convenient means to elevate the trailer tongue into position over the housing when the tractor is backed into place in coupling the trailer to the tractor.

From the foregoing, it will be seen that with my arrangement of parts the draw bar pull is applied at the usual point of connection of the tractor and in such a way as to tend to keep the forward guiding wheels of the tractor in contact with the ground, the force tending to reduce traction of the driving wheels when a load is applied being overcome by the application of the weight through the tongue 7 over the rear axle. In order to disconnect the tractor and trailer it is only necessary to release the connection 15—16 after having first lowered the foot 22 and to drive the tractor off, the bolt 17 passing freely out from between the forks of the tongue. To connect the tractor and trailer again, the reverse operation is conducted.

From the foregoing description, taken in connection with the accompanying drawing, it is thought the complete construction, operation and advantages of my invention will be readily understood by those skilled in the art to which the invention relates.

What I claim is:

1. A trailer comprising a frame, a pair of wheels on which said frame is mounted, a forked tongue projected horizontally from one end of said frame, a standard depending from said frame, a draw bar connection to said standard below the level of the tongue and adapted for connection with the draw bar coupling of a tractor below the axis of the driving wheels, said tongue being of greater length than said draw bar, said tongue including leaf springs at the fork.

2. A trailer comprising a frame, a pair of wheels, means for mounting said frame on said wheels, a forked tongue projecting from one end of said frame, a standard depending from said frame, a draw bar connected to said standard below the level of the tongue, a saddle adapted to be mounted on a tractor over the drive wheel axle housing thereof, said draw bar adapted to be connected to said tractor housing below the axis of the driving wheel of the tractor, and a guide bolt on said saddle which said tongue is adapted to straddle and by which said tongue is guided, said tongue having its fork composed of sets of leaf springs.

3. In combination with a tractor having a rear axle housing and driving wheels; a saddle supported on the housing, a trailer having a tongue projecting over and resting on said saddle, means for guiding said tongue, a draft connection between said tractor and said trailer located below the plane of the tongue, said saddle including downwardly and rearwardly curved portion with anti-friction rollers.

OTTO H. HESSE.